US012475627B2

(12) United States Patent
Nagahara et al.

(10) Patent No.: US 12,475,627 B2
(45) Date of Patent: Nov. 18, 2025

(54) INFORMATION PROVISION SYSTEM AND INFORMATION PRESENTATION PROGRAM

(71) Applicant: KAWASAKI JUKOGYO KABUSHIKI KAISHA, Kobe (JP)

(72) Inventors: Hitoshi Nagahara, Kobe (JP); Junya Hara, Kobe (JP); Takeshi Aoyama, Kobe (JP); Tomomi Yasuda, Kobe (JP); Tadayuki Inoue, Kobe (JP); Sakiko Shiga, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 240 days.

(21) Appl. No.: 18/254,641

(22) PCT Filed: Nov. 29, 2021

(86) PCT No.: PCT/JP2021/043647
§ 371 (c)(1),
(2) Date: May 26, 2023

(87) PCT Pub. No.: WO2022/114184
PCT Pub. Date: Jun. 2, 2022

(65) Prior Publication Data
US 2024/0303898 A1    Sep. 12, 2024

(30) Foreign Application Priority Data

Nov. 30, 2020  (JP) ................. 2020-198578

(51) Int. Cl.
*G06T 15/00*  (2011.01)
(52) U.S. Cl.
CPC ................. *G06T 15/00* (2013.01)

(58) Field of Classification Search
CPC ..... G06T 19/006; G06T 7/70; G06T 2210/21; G06T 19/00; G06T 15/20;
(Continued)

(56) References Cited

U.S. PATENT DOCUMENTS

2018/0315134 A1    11/2018  Amitay et al.
2019/0107990 A1*    4/2019  Spivack ................. G06T 11/60
2020/0286253 A1*    9/2020  Chilcote-Bacco .... G06T 19/006

FOREIGN PATENT DOCUMENTS

JP    2014-146357 A    8/2014
JP    5788429 B2       9/2015
JP    2018-156373 A    10/2018

OTHER PUBLICATIONS

Feb. 1, 2022 International Search Report issued in International Patent Application No. PCT/JP2021/043647.
(Continued)

*Primary Examiner* — Hau H Nguyen
(74) *Attorney, Agent, or Firm* — Oliff PLC

(57) ABSTRACT

A program causes a processor to acquire a first position coordinate indicating a position of a first mobile terminal of a first user, and acquire a second position coordinate indicating a position of a second mobile terminal of a second user. The program causes the processor to generate a virtual space image including a space corresponding to a real space in a predetermined area including the first position coordinate, and a second user icon corresponding to the second position coordinate in the real space. The program causes the processor to cause the first mobile terminal to display the virtual space image. The program causes the processor to acquire data associated with the second user and cause the first mobile terminal to display data associated with the second user by linking the data with the virtual space image.

17 Claims, 12 Drawing Sheets

(58) Field of Classification Search
CPC ... G06T 2219/024; G06T 15/00; G06T 17/00; G06F 16/5854; G06F 16/583
See application file for complete search history.

(56) References Cited

OTHER PUBLICATIONS

Feb. 1, 2022 Written Opinion issued in International Patent Application No. PCT/JP2021/043647.

Makita et al., "Annotation Overlay on Wearable Computer Users with Hybrid P2P Communication", IEICE Technical Report, Sep. 5, 2006, vol. 106, No. 234, pp. 91-96.

* cited by examiner

INFORMATION PROVISION SYSTEM AND INFORMATION PRESENTATION PROGRAM

CROSS-REFERENCE TO RELATED APPLICATIONS

This is a U.S. National Phase Application of PCT/JP2021/043647 filed on Nov. 29, 2021, which designates the United States and claims priority to Japanese Patent Application No. 2020-198578, filed on Nov. 30, 2020, the entire contents of which are incorporated herein by reference.

TECHNICAL FIELD

The present disclosure relates to an information provision system and an information presentation program.

BACKGROUND ART

Patent literature 1 discloses a server system that draws a result of matching that enables communication between persons located in a predetermined area.

CITATION LIST

Cited Literature

PTL 1: JP 5788429 B

SUMMARY OF INVENTION

Technical Problem

Even if a person is informed of the result of matching by this system, it is time-consuming and laborious for the person to accurately identify, in a real world, the other person indicated in the result of matching.

It is an object of the present disclosure to enable a person to accurately identify an other person in a real world in a visually recognized area by relating the real world in the visually recognized area to information about the other person browsed on a mobile terminal.

Solution to Problem

An information provision system according to one aspect of the present disclosure includes a processor configured to execute a program, and a storage medium in which the program is stored. The program causes the processor to acquire a first position coordinate indicating a position of a first mobile terminal of a first user, and acquire a second position coordinate indicating a position of a second mobile terminal of a second user. The program causes the processor to generate a virtual space image that includes: a space corresponding to a real space in a predetermined area including the first position coordinate; and a second user icon corresponding to the second position coordinate in the real space. The program causes the processor to cause the first mobile terminal to display the virtual space image. The program causes the processor to acquire data associated with the second user and cause the first mobile terminal to display the data associated with the second user by linking the data with the virtual space image.

In this configuration, the first mobile terminal is caused to display a virtual space image. The virtual space includes a space that is included in a predetermined specific space in a real space including the first position coordinate and that is determined based on the first position coordinate. The virtual space also includes a second user icon corresponding to the second position coordinate. This configuration makes it easy for the first user to visually identify, in the real space, the second user (other person) corresponding to the second user icon (other-person icon).

An information presentation program according to another aspect of the present disclosure is an information presentation program installed in a first mobile terminal of a first user. The program causes a processor to acquire a first position coordinate indicating a position of the first mobile terminal. The program causes the processor to generate a virtual space image that includes: a space corresponding to a real space in a predetermined area including the first position coordinate; and a second user icon corresponding to a second position coordinate indicating a position of a second mobile terminal of a second user located in the real space. The program causes the processor to cause the first mobile terminal to display the virtual space image. The program causes the processor to acquire data associated with the second user and cause the first mobile terminal to display the data associated with the second user by linking the data with the virtual space image. The information presentation program is stored in a storage medium readable by a computer. The storage medium is a non-transitory and tangible medium.

Advantageous Effects of Invention

The aspects of the present disclosure enable a user to accurately identify an other person in a real world in a visually recognized area in a state in which the real world in the visually recognized area is related to information about the other person browsed on a mobile terminal.

DESCRIPTION OF EMBODIMENT

Embodiments will be described below with reference to the drawings.

Figure 1:
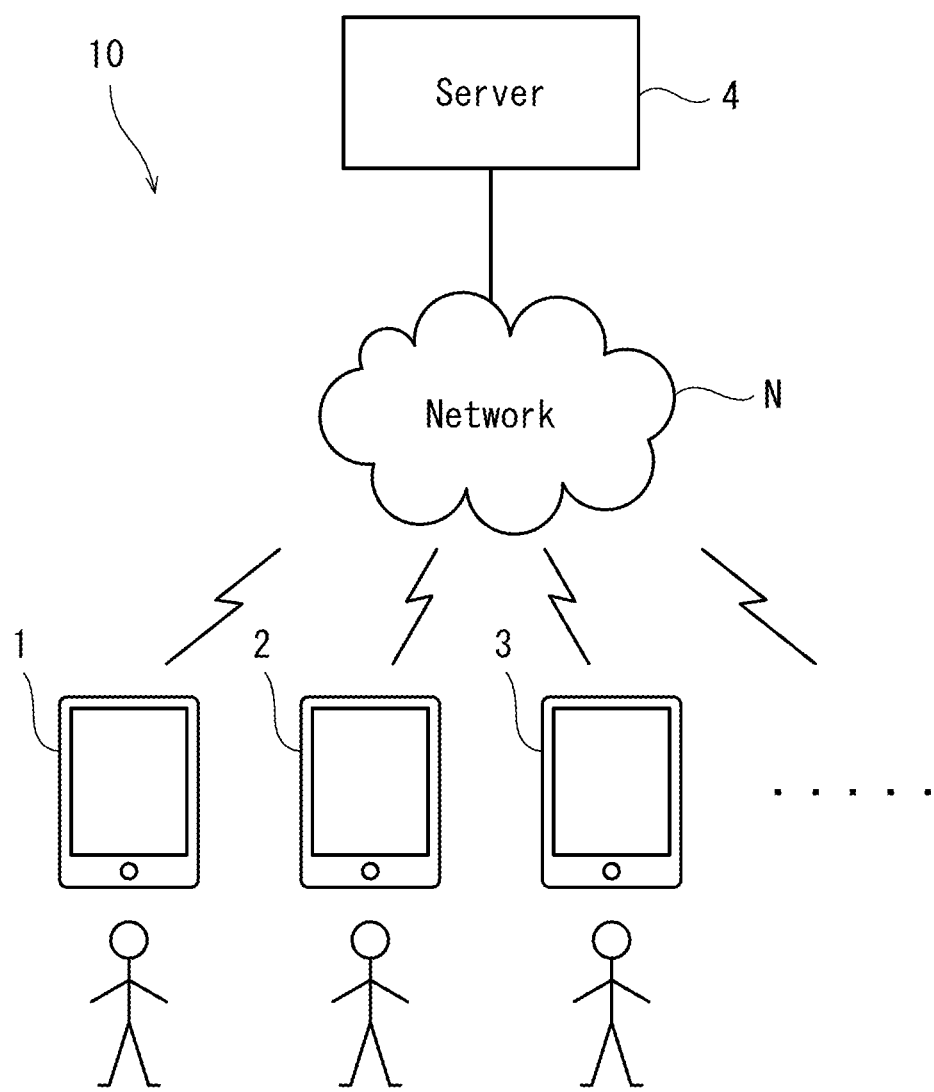
FIG. 1 is a diagram of a network configuration of an information provision system according to an embodiment.

FIG. 1 is a diagram of a network configuration of an information provision system 10 according to an embodiment. As illustrated in FIG. 1, in the information provision system 10, mobile terminals 1 to 3 are communicably connected to a server 4 via a network N. Examples of the mobile terminals 1 to 3 include smartphones and tablets. In this example, the first mobile terminal 1 is possessed by a first user, the second mobile terminal 2 is possessed by a second user, and the third mobile terminal 3 is possessed by a third user (an nth mobile terminal is possessed by an nth user (i is a natural number)). An example of the network N is an external network such as the Internet, a cell phone network, and a satellite communication channel.

Figure 2:
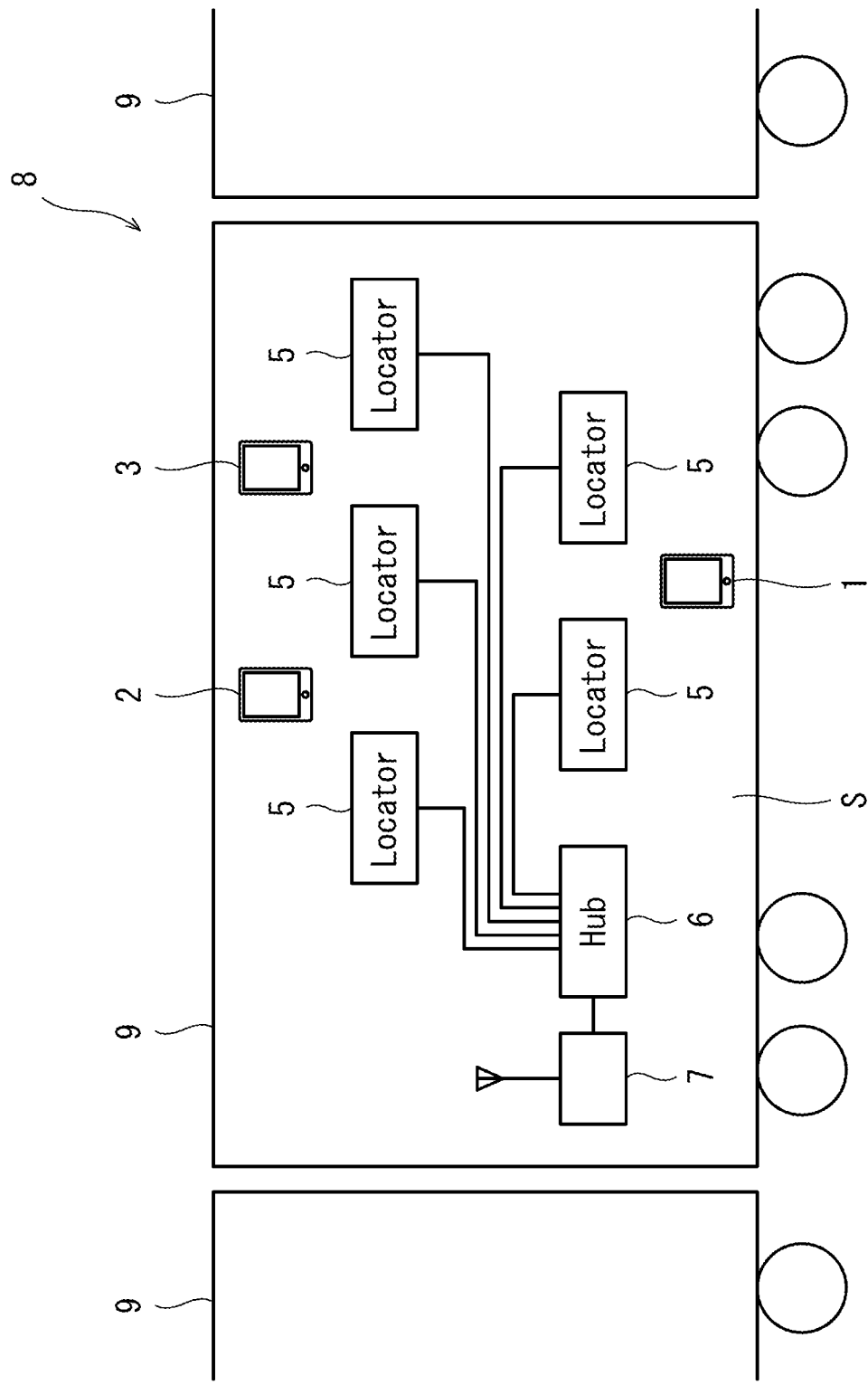
FIG. 2 is a diagram of an in-vehicle configuration of the information provision system illustrated in FIG. 1.

FIG. 2 is a diagram of an in-vehicle configuration of the information provision system 10 illustrated in FIG. 1. As illustrated in FIG. 2, the information provision system 10 provides its services in a predetermined specific space (for example, an interior space of a structure). The predetermined specific space includes a position coordinate of the first mobile terminal 1 in a real space. In this embodiment, it will be assumed that the first to third users use the services of the information provision system 10 with the mobile terminals 1 to 3 respectively held by the first to third users in a passenger space S (the interior space) of a train set 8 (an example of the structure) on a railroad. Instead of a railcar, the structure may be a building (for example, a shopping mall). The specific space will not be limited to the interior space of a structure. The specific space may be a limited area of an exterior space (examples including an amusement park, an event venue, and a campsite).

The train set 8 includes railcars 9, which are connected to each other. In each of the railcars 9, four or more locators 5 are installed at and dispersed to predetermined spots. The mobile terminals 1 to 3 transmit and receive radio signals to and from the locators 5. This ensures highly precise estimation of three-dimensional position coordinates that indicate positions of the mobile terminals 1 to 3 in the railcar 9.

The locators 5 function as sensors that wirelessly communicate with the mobile terminals 1 to 3 to acquire information that enables estimation of position coordinates of the mobile terminals 1 to 3. Specifically, the radio signals used by the locators 5 may be radio waves, sound waves, light, or magnetism. Examples of the principle on which the position estimation using the locators 5 is based include: AOA (Angle Of Arrival), which is a method using an angle of arrival of a signal; RSSI (Received Signal Strength Indicator), which is a method using the strength of a received signal; TOA (Time Of Arrival), which is a method using a time of arrival of a signal; and TDOA (Time Difference Of Arrival), which is a method using a difference in time of arrival of signals. Use of any of these position-estimation principles enables estimation of three-dimensional position coordinates of the first to third mobile terminals 1 to 3 (mobile stations) through communication with the locators 5 (base stations).

The respective locators 5 are communicably connected to a position coordinate device 7 via a hub 6. The position coordinate device 7 includes a processor and a memory, calculates position coordinates of the mobile terminals 1 to 3 based on the information from the locators 5, and transmits the calculated position coordinates to the first mobile terminal 1. Specifically, the position coordinate device 7 acquires basic information obtained by the transmission and reception of the radio signals between the mobile terminals 1 to 3 and the locators 5 (examples of such basic information including an angle of arrival of a signal, the strength of a received signal, the time of arrival, or a time difference of arrival). Then, based on the basic information, the position coordinate device 7 calculates three-dimensional position coordinates of the mobile terminals 1 to 3 relative to the passenger space S (relative position coordinates relative to the passenger space S). Then, the position coordinate device 7 transmits the calculated position coordinates to the respective mobile terminals 1 to 3 via the network N (see FIG. 1). The position coordinates may be transmitted using a wireless communication system (for example, Wi-Fi) installed in the railcar 9, instead of the network N. The position coordinates of the mobile terminals 1 to 3 may be acquired using satellite positioning.

Figure 3:
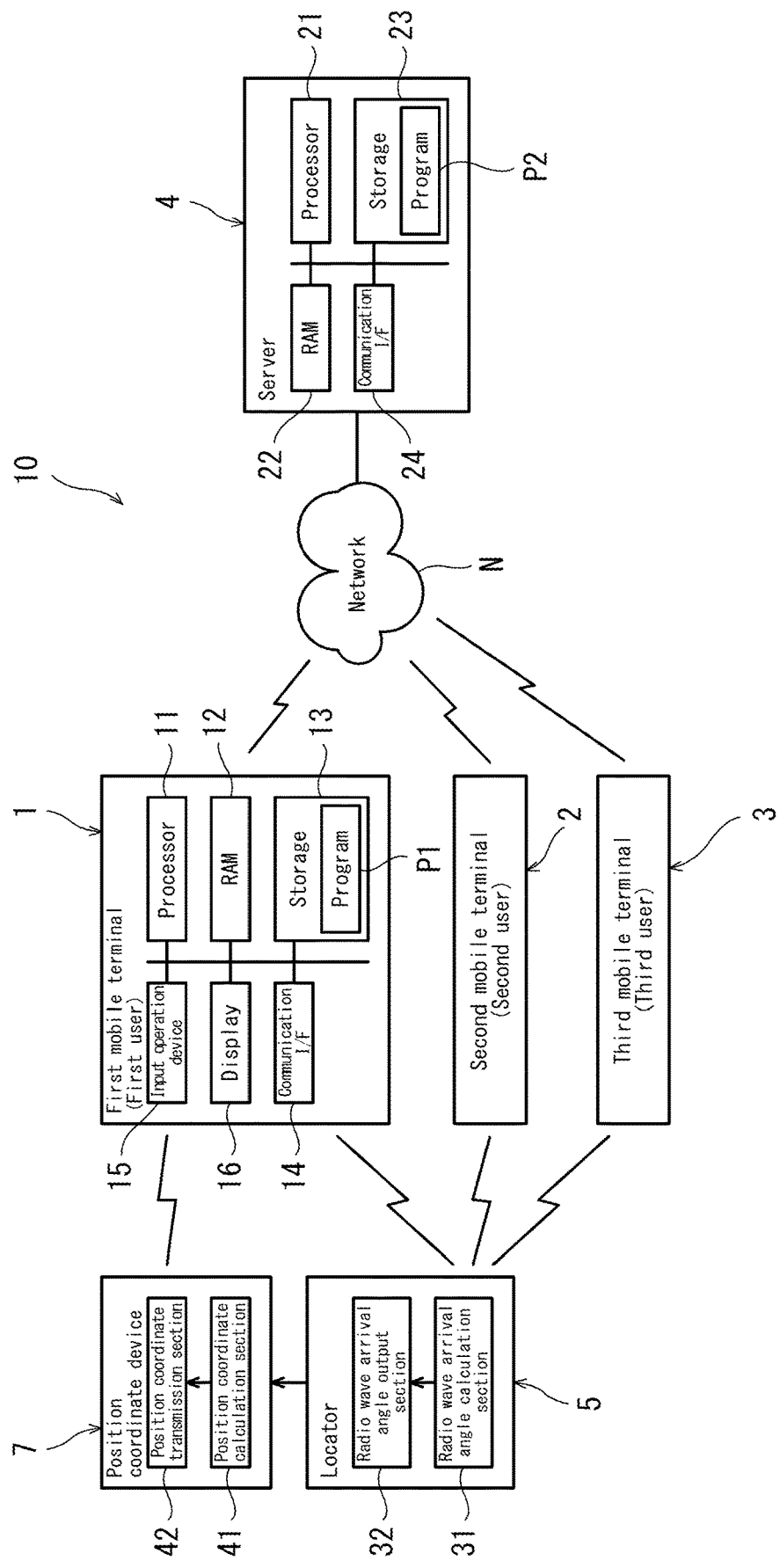
FIG. 3 is a block diagram of the information provision system illustrated in FIGS. 1 and 2.

FIG. 3 is a block diagram of the information provision system 10 illustrated in FIGS. 1 and 2. For convenience of description, three mobile terminals, 1 to 3, are illustrated in FIG. 3. The number of mobile terminals, however, may be increased or decreased depending on the number of users in the railcar 9. The mobile terminals 1 to 3 are substantially the same as each other. Therefore, the first mobile terminal 1 will be described alone as a representative. As illustrated in FIG. 3, the first mobile terminal 1 includes a processor 11, a main memory 12 (RAM), a storage 13 (storage medium), a communication interface 14, an input operation device 15, and a display 16. An example of the processor 11 is a CPU. Examples of the storage 13 include a hard disk and a flash memory. The main memory 12 and the storage 13 may be collectively referred to as a memory. In the storage 13, an information presentation program P1 is stored. The information presentation program P1 is installed in the first mobile terminal 1. The information presentation program P1 is read by the main memory 12 and executed by the processor 11. The information presentation program P1 may be located in another place such as a cloud, instead of being installed in the first mobile terminal 1.

The communication interface 14 includes both of a communication interface for wireless communication with the network N (an example of such interface being a communication device using a cell phone line) and a communication interface for wireless communication with the locators 5 (an example of such interface being a communication device using short-range wireless communication (Bluetooth (registered trademark))). The input operation device 15 is a device operated by the first user to input a command into the first mobile terminal 1. The display 16 is a display that displays a screen for the first user. For example, the first mobile terminal 1 includes a touch screen display. The touch screen display can serve as the input operation device 15 and the display 16. The input operation device 15 may include a voice input device.

The server 4 includes a processor 21, a main memory 22 (RAM), a storage 23 (storage medium), and a communication interface 24. An example of the processor 21 is a CPU. Examples of the storage 23 include a hard disk and a flash memory. The main memory 22 and the storage 23 may be collectively referred to as a memory. In the storage 23, an information provision program P2 is installed. The information provision program P2 is installed in the server 4. The information provision program P2 is read by the main memory 22 and executed by the processor 21. The communication interface 24 is a communication interface for communication with the network N.

Each of the locators 5 includes a radio wave arrival angle calculation section 31 and a radio wave arrival angle output section 32. The radio wave arrival angle calculation section 31 calculates the arrival angle (reception direction) of a radio wave (for example, a radio wave of Bluetooth (registered trademark) communication) received from each of the mobile terminals 1 to 3. The radio wave arrival angle output section 32 outputs the arrival angle of the radio wave calculated by the radio wave arrival angle calculation section 31. The information on the radio wave arrival angle calculated by the radio wave arrival angle calculation section 31 is basic information that enables the three-dimensional position coordinate of each of the mobile terminals 1 to 3 to be estimated according to AOA. While a configuration using AOA has been described as a configuration of each locator 5, it is also possible to employ a configuration using RSSI, TOA, or TDOA.

The position coordinate device 7 includes a position coordinate calculation section 41 and a position coordinate transmission section 42. The position coordinate calculation section 41 calculates position coordinates of the mobile terminals 1 to 3 according to AOA based on the radio wave arrival angles from the locators 5. The position coordinate transmission section 42 transmits the calculated position coordinates of the mobile terminals 1 to 3 to the respective mobile terminals 1 to 3. The position coordinate transmission section 42 may transmit the calculated position coordinates of the mobile terminals 1 to 3 to the server 4.

The position coordinate device 7 also serves as an attribute information transmission device that transmits, to the server 4, attribute information regarding attributes of places at which the position coordinates of the mobile terminals 1 to 3 exist. For example, the position coordinate device 7 receives, from an in-vehicle LAN of the train set 8, attributes (for example, car number, destination, and next stop) of one railcar 9, among the railcars 9, in which the first position coordinate of the first mobile terminal 1 exists (the one railcar 9 will be hereafter referred to as "target railcar"). Then, the position coordinate device 7 transmits the attributes to the server 4. The attribute information transmission device may be provided separately from the position coordinate device 7.

In the following description, the processing in the first mobile terminal 1 is performed by the processor 11 executing the information presentation program P1 installed in the first mobile terminal 1. The processing in the second mobile terminal 2 is performed by the processor 11 executing the information presentation program P1 installed in the second mobile terminal 2. The processing in the server 4 is performed by the processor 21 executing the information provision program P2, which is installed in the server 4.

Figure 4:
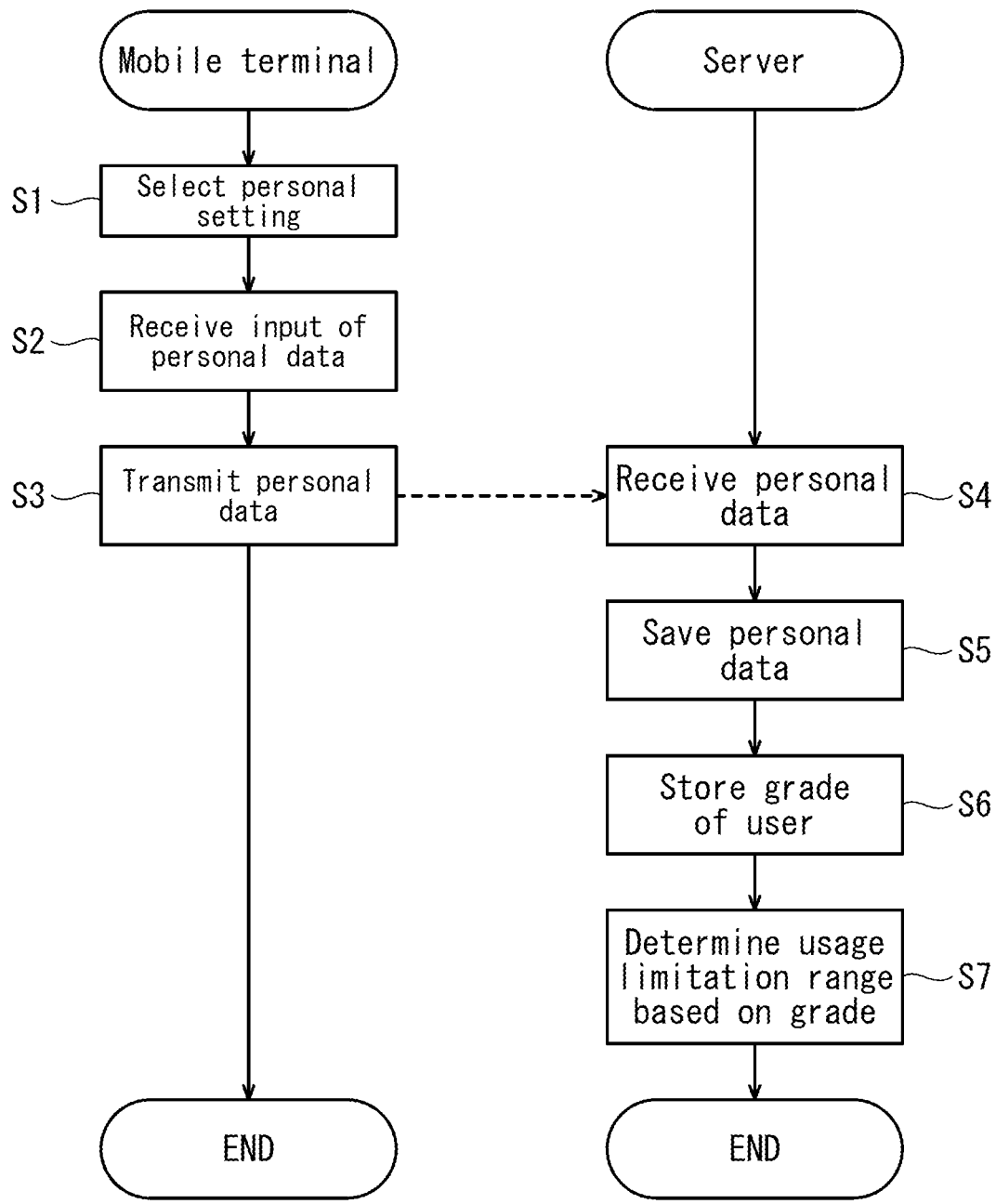
FIG. 4 is a flowchart of processing of personal setting performed in the information provision system illustrated in FIG. 3.

FIG. 4 is a flowchart of processing of personal setting, which is performed in the information provision system 10 illustrated in FIG. 3. As illustrated in FIGS. 3 and 4, each of the first to third users uses the input operation device 15 of each of the mobile terminals 1 to 3 to select a personal setting input part 63a on a virtual space image page 51 (see FIG. 6(A)) (step S1). Upon this selection, a setting screen is displayed on the display 16 of each of the mobile terminals 1 to 3 (step S2). The setting screen receives input of data (personal data) related to each of the users.

The personal data may include: unpublicized data, which is prohibited from being publicized to other persons; and voluntarily publicized data, which is allowed to be publicized to other persons. The voluntarily publicized data may include pieces of item data. Upon completion of the input of the personal data on the setting screen, the personal data is transmitted to the server 4 from each of the mobile terminals 1 to 3.

The server 4 receives the personal data transmitted from each of the mobile terminals 1 to 3 (step S4). The server 4 saves the received personal data in the storage 23 by linking the personal data with identification information of each of the users (step S5). The server 4 also stores grade information of each of the users in the storage 23 by linking the grade information with the identification information of each of the users (step S6).

The grade information may be billing information of each of the users, may be determined based on the billing information of each of the users, or may be determined based on the frequency of usage of the system by each of the users. For example, the grade information may be set such that as a user is charged a larger billing amount, the user is more highly graded. For example, a user with free membership may be set as a low-grade member, and a user with paid membership may be set as a high-grade member. The users may be graded based on whether the users have free membership or paid membership. The grade information may be set such that as a user uses the system more frequently, the user is more highly graded. The user may be graded higher as the accumulated usage time of the user is longer and/or as the amount of information provided by the user is larger.

Based on the stored grade information, the server 4 determines a usage limitation range of the user having the corresponding grade (step S7). The determined usage limitation range is stored and linked with the identification information of each of the users. The usage limitation range may be an accessible data range of another person's voluntarily publicized personal data, or may be an accessible, specific space range.

Figure 5:
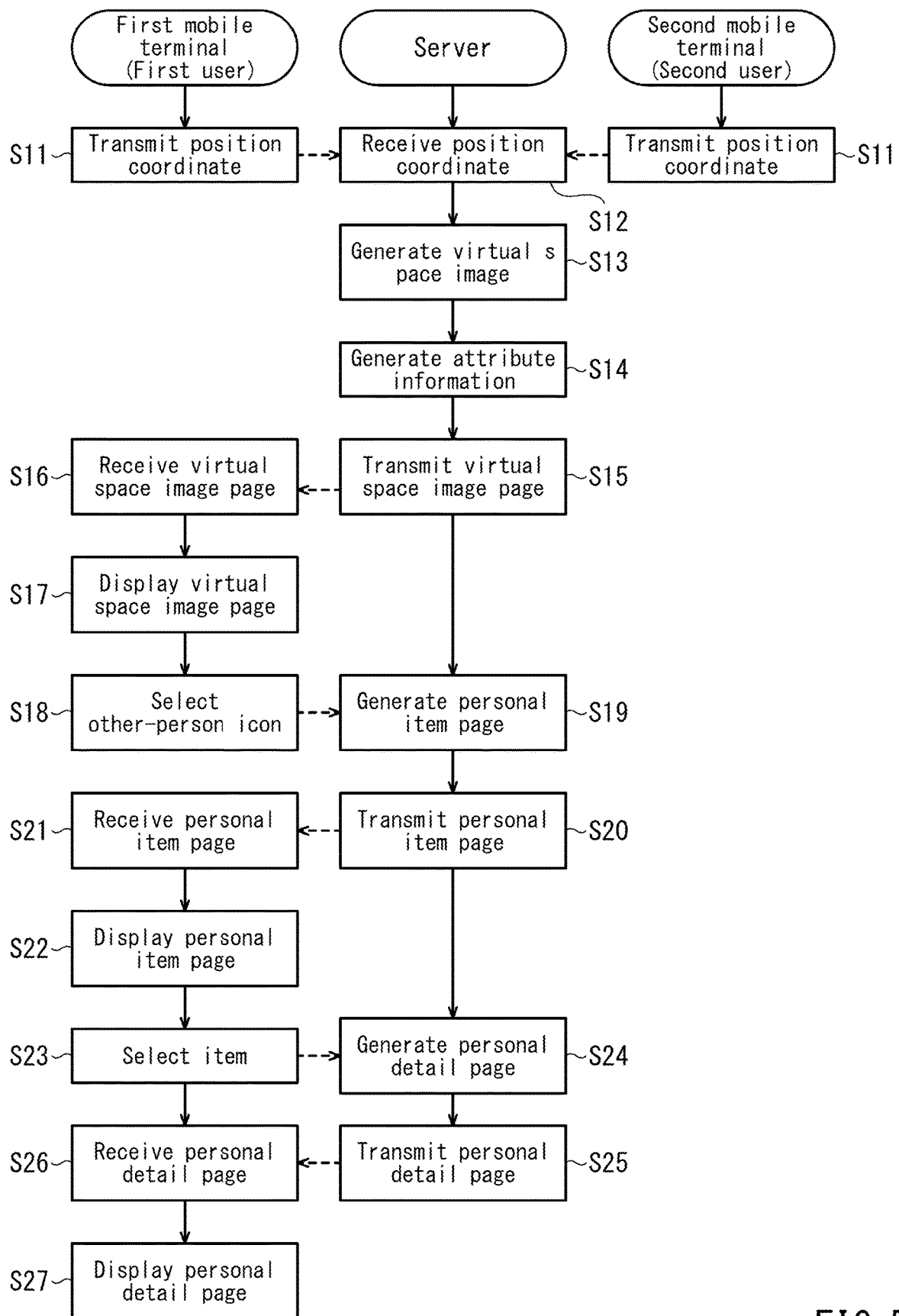
FIG. 5 is a flowchart of basic processing, which is performed in the information provision system illustrated in FIG. 3.
Figure 6A:
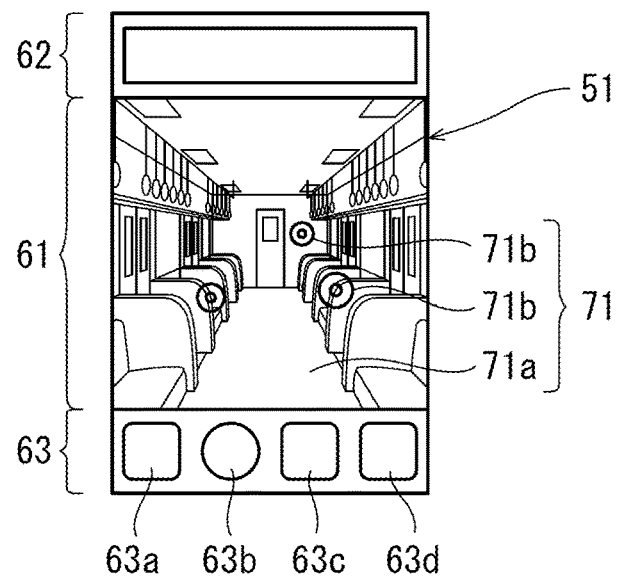
FIG. 6(A) illustrates a virtual space image page displayed on a first mobile terminal illustrated in FIG. 3.
Figure 6B:
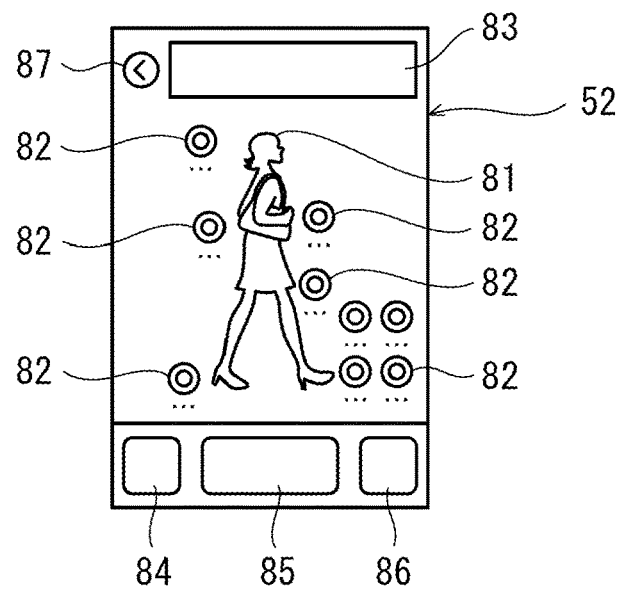
FIG. 6(B) illustrates a personal item page displayed on the first mobile terminal upon selection of an other-person icon in FIG. 6(A).
Figure 6C:
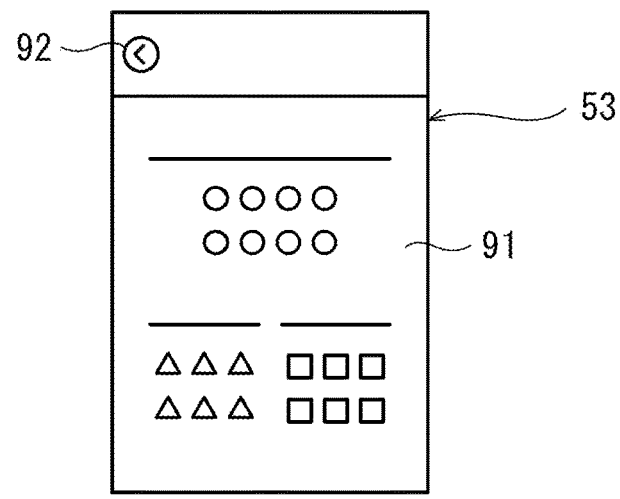
FIG. 6(C) illustrates a personal detail page displayed on the first mobile terminal upon selection of an item icon in FIG. 6(B).

FIG. 5 is a flowchart of basic processing, which is performed in the information provision system 10 illustrated in FIG. 3. FIG. 6(A) illustrates the virtual space image page 51, which is displayed on the first mobile terminal 1 in FIG. 3. FIG. 6(B) illustrates a personal item page 52, which is displayed on the first mobile terminal 1 upon selection of an other-person icon 71b in FIG. 6(A). FIG. 6(C) illustrates a personal detail page 53, which is displayed on the first mobile terminal 1 upon selection of an item icon 82 in FIG. 6(B). The basic processing will be described below according to the flowchart in FIG. 5 while referring to FIGS. 6(A) to 6(C) as necessary.

In the following description, the first user of the first mobile terminal 1 will be regarded as a user in question, and the second user of the second mobile terminal 2 will be regarded as an other person. The third mobile terminal 3 is similar to the second mobile terminal 2 and will not be elaborated upon here.

Upon activation of the information presentation program P1 in each of the first mobile terminal 1 and the second mobile terminal 2, the first mobile terminal 1 transmits its first position coordinate received from the position coordinate device 7 to the server 4; and the second mobile terminal 2 transmits its second position coordinate received from the position coordinate device 7 to the server 4 (step S11). The server 4 receives the position information of each of the first mobile terminal 1 and the second mobile terminal 2 (step S12).

The server 4 generates a virtual space image 71 (see FIG. 6(A)) based on the position information of each of the first mobile terminal 1 and the second mobile terminal 2 (step S13). The virtual space image 71 includes a field-of-view space image 71a and other-person icons 71b (second user icons). The other-person icons 71b are displayed on the field-of-view space image 71a.

The server 4 generates attribute information regarding attributes (for example, car number, destination, and next stop) of the railcar 9 in which the first position coordinate received from the first mobile terminal 1 exists (step S14). The server 4 creates a virtual space image page 51 using the generated attribute information and the generated virtual space image 71, and transmits the virtual space image page 51 to the first mobile terminal 1 (step S15).

As illustrated in FIG. 6(A), the first mobile terminal 1 receives the virtual space image page 51 (step S16), and displays the virtual space image page 51 on the display 16 (step S17). The virtual space image page 51 includes, for example, a virtual space image display part 61, an attribute information display part 62, and an input display part 63. In the virtual space image display part 61, the virtual space image 71 is displayed, including the field-of-view space image 71a and the other-person icon 71b.

The field-of-view space image 71a is a predetermined space section of a predetermined space (passenger space S) including the first position coordinate in a real space. The predetermined space section is determined based on the first position coordinate. (The field-of-view space image 71a is a predetermined section image. The predetermined section is determined based on the first position coordinate in the passenger space S including the first position coordinate in a real space. The predetermined space section is determined based on the first position coordinate.) Specifically, the field-of-view space image 71a is an image of a three-dimensional space that is included in the passenger space S including the first position coordinate in the real space and that is visually recognized from the position corresponding to the first position coordinate. When the first mobile terminal 1 exists in the target railcar 9 of the train set 8, the field-of-view space image 71a is an image of a space that is included in the passenger space S of the one target railcar 9 and that is visible from the first position coordinate. The point of sight of the field-of-view space image 71a is at the position corresponding to the first position coordinate. The field-of-view space image 71a may include an icon of the first user, who is the user in question, or may not necessarily include such icon.

The direction of sight of the field-of-view space image 71a may be variable by a rotation about the first position coordinate serving as reference point (point of sight) upon the first user performing a change operation of changing the direction of sight (for example, a scroll operation on the touch screen of the first mobile terminal 1). In response to a request from the first mobile terminal 1, the server 4 may transmit, to the first mobile terminal 1, a virtual space image 71 that includes a field-of-view space image 71a in the direction of sight as requested. (When there is no change operation on the field-of-view space image 71a by the first user) While the field-of-view space image 71a on display is in a state unmoved by any operation, the field-of-view space image 71a is the image of the space section that is included the passenger space S and that has been determined based on the first position coordinate.

The field-of-view space image 71a may be operated by the first user to be changed into an image of a displaced space not based on the first position coordinate. For example, while the first position coordinate may remain in the passenger space S of the specific target railcar 9, and the first user may perform an operation of virtually displacing the point of sight to the passenger space of an adjacent railcar and displaying an image of this passenger space as the field-of-view space image 71a.

Each other-person icon 71b is disposed at a three-dimensional position on the field-of-view space image 71a. The three-dimensional position corresponds to the position coordinate of the mobile terminal of the other person who exists in the passenger space S including the first position coordinate. The other-person icon 71b corresponding to the second mobile terminal 2 is disposed at the second position coordinate on the field-of-view space image 71a. A hyperlink to the personal item page 52 is embedded in the other-person icon 71b. The other-person icon 71b may be disposed at a position displaced from the second position coordinate, insofar as the other-person icon 71b is recognized as corresponding to the second position coordinate. The other-person icon 71b may be in the form of a symbol or a shape similar to a human. With this form, the other-person icon 71b is disposed at a three-dimensional position, enabling the first user to recognize whether the second user is standing or sitting in the real space.

The size of the other-person icon 71b may be determined such that the other-person icon 71b reduces in size as the distance between the point of sight of the field-of-view space image 71a (the first position coordinate) and the second position coordinate increases. The form of display of the other-person icon 71b may be determined based on the personal setting of the user corresponding to the other-person icon 71b. For example, the color of display may be determined based on the gender of the user corresponding to the other-person icon 71b (for example, blue for a male user and pink for a female user).

The first mobile terminal 1 periodically acquires a first position coordinate, and the second mobile terminal 2 periodically acquires a second position coordinate. Based on a movement of the first position coordinate, the server 4 updates the virtual space image 71 to display a field-of-view space image 71a that is based on the first position coordinate corresponding to the movement. Thus, upon movement of the first mobile terminal 1, the field-of-view space image 71a of the virtual space image 71 on the virtual space image page 51 changes successively according to movements of the first mobile terminal 1.

If the first mobile terminal 1 moves to the adjacent railcar 9, the target railcar is replaced by the adjacent railcar. Also, the field-of-view space image 71a of the virtual space image 71 is replaced by the field-of-view space image 71a of the passenger space S of the adjacent railcar 9. The passenger spaces adjacent to each other (space sections each constituting a specific space) are not continuous with each other. With this configuration, one field-of-view space image 71a is switched to another field-of-view space image 71a discontinuously as the first position coordinate moves between the passenger spaces.

The attribute information display part 62 displays the attribute information about the target railcar 9, in which the first user exists. Examples of the information displayed in the attribute information display part 62 include the car number, the destination, and the next stop of the target railcar 9. The display of the attribute information enables the first user to easily grasp the information about the attributes of the target railcar, among the railcars 9, in which the first user exits.

The input display part 63 displays, for example, a personal setting input part 63a, an emergency input part 63b, an administrator-addressed message function part 63c, and an emotion input part 63d. Upon the first user selecting (tapping) the personal setting input part 63a, the setting screen described at step S2 referring to FIG. 4 is displayed, prompting the first user to input the personal data. The emergency input part 63b, the administrator-addressed message function part 63c, and the emotion input part 63d will be described later.

Upon the first user selecting (tapping) the other-person icon 71b corresponding to the second user (step S18), the information corresponding to the selection is transmitted to the server 4 based on the hyperlink embedded in the selected other-person icon 71b. The server 4 generates a personal item page 52 of the second user who is correlated with the selected other-person icon 71b (step S19), and transmits the personal item page 52 to the first mobile terminal 1 (step S20).

As illustrated in FIG. 6(B), the first mobile terminal 1 receives the personal item page 52 (step S21), and displays the personal item page 52 on the screen of the display 16 (step S22). Examples displayed on the personal item page 52 include an avatar 81, item icons 82, a title display part 83, an other-person addressed message function part 84, an external evaluation display part 85, a reaction input part 86, and a back selection part 87.

The avatar 81 may be an avatar determined by the information presentation program P1 or an avatar customized by personal setting of the second user. The avatar 81 may be omitted. The item icons 82 are disposed at positions close to parts of the avatar 81 highly relevant to the details of the respective item icons. For example, the item icon 82 related to hair is disposed at a position close to the head of the avatar 81, and the item icon 82 related to shoes is disposed at a position close to a foot of the avatar 81. If there is no avatar 81, the item icons 82 may be displayed in list form. The item icons 82 may be in text form, instead of icon form.

Examples displayed on the title display part 83 include a user name of the second user and text set by the second user. In the back selection part 87, a hyperlink to the virtual space image page 51 is embedded. Upon the first user selecting (tapping) the back selection part 87, the display returns to the virtual space image page 51, which is at a higher hierarchical level, based on the hyperlink embedded in the back selection part 87. On the first mobile terminal 1, the personal item page 52 correlated with the virtual space image page 51 is displayed. The other-person addressed message function part 84, the external evaluation display part 85, and the reaction input part 86 will be described later.

Upon the first user selecting (tapping) one of the item icons 82 (step S23), the information corresponding to the selection is transmitted to the server 4 based on the hyperlink embedded in the selected item icon 82. The server 4 generates a personal detail page 53 of the second user who is correlated with the selected item icon 82 (step S24), and transmits the personal detail page 53 to the first mobile terminal 1 (step S25).

As illustrated in FIG. 6(C), the first mobile terminal 1 receives the personal detail page 53 (step S26), and displays the personal detail page 53 on the screen of the display 16 (step S27). On the personal detail page 53, a detail data display part 91 and a back selection part 92 are displayed.

The detail data display part 91 displays item data corresponding to the selected item. For example, if the item icon 82 related to the hair is selected, information about hair (for example, information of a hair salon that the second user goes to) is displayed on the personal detail page 53 as voluntarily publicized data specified to be publicized by personal setting of the second user. If the item icon 82 related to the shoes is selected, information about shoes (for example, information of a favorite shoe brand) is displayed on the personal detail page 53 as voluntarily publicized data registered by personal setting of the second user. This configuration enables the first user to immediately and accurately identify the data publicized by the second user by linking the data with the real space.

In the back selection part 92, a hyperlink to the personal item page 52 is embedded. Upon the first user selecting (tapping) the back selection part 92, the display returns to the personal item page 52, which is at a higher hierarchical level, based on the hyperlink embedded in the back selection part 92. On the first mobile terminal 1, the personal detail page 53 correlated with the virtual space image page 51 through the personal item page 52 is displayed. The personal item page 52 and the personal detail page 53 constitute a personal page related to the second user.

With the above-described configuration, it is easy for the first user to visually recognize the second user (other person) corresponding to the other-person icon 71b in the real space by looking at the virtual space image display part 61 on the virtual space image page 51. The first user is then able to visually compare the other-person icon 71b of the second user in the virtual space image 71 with the actual second user in the real space. Then, if the first user wishes, the personal data related to the second user can be displayed.

In other words, after the first user has identified an other person that the first user is interested in, the first user is able to select the other-person icon 71b corresponding to the other person on the virtual space image page 51. In this manner, the first user is able to immediately and accurately look at the personal pages (the personal item page 52 and the personal detail page 53) correlated with the second user in the real space. This configuration provides an advantageous improvement in users' convenience.

A usage limitation range is determined based on the grade information of the first user. When the server 4 generates the virtual space image 71, it is possible for the server 4 to, based on usage limitation range, change the specific area determined in advance based on the first position coordinate. If the first user is a first grade user (for example, has paid membership), the server 4 sets a broader range of space displayable on the virtual space image 71 than if the first user is a second grade user, who is lower in grade than a first grade user (an example of a second grade user being a user having free membership).

For example, if the first user is a first grade user, the server 4 sets the range of space displayable on the virtual space image 71 on the virtual space image page 51 to: the passenger space S of the target railcar 9, to which the first position coordinate belongs; and the passenger space S of a non-target railcar 9, to which the first position coordinate does not belong. If the first user is a second grade user, the server 4 sets the range of space displayable on the virtual space image 71 on the virtual space image page 51 to only the passenger space S of the target railcar 9, to which the first position coordinate belongs. This configuration allows for providing various usage forms by changing the range of the virtual space image 71 accessible by a user based on the user's grade information (for example, billing information).

Based on the usage limitation range determined based on the grade information of the first user, the server 4 may determine the accessible range of the personal page to be displayed on the first mobile terminal. If the first user is a first grade user, the server 4 sets a broader range of personal data displayable on the personal pages (the personal item page 52 and the personal detail page 53) than if the first user is a second grade user. For example, if the first user is a first grade user, the server 4 may set both the personal item page 52 and the personal detail page 53 as content displayable on the first mobile terminal 1. If the first user is a second grade user, the server 4 may set only the personal item page 52 as content displayable on the first mobile terminal 1, and may set the personal detail page 53 as content not displayable on the first mobile terminal 1.

The server 4 may determine the usable range of functions based on the usage limitation range determined based on the grade information of the first user. For example, if the first user is a first grade user, the server 4 may set at least one of the following functions unusable: the emergency input part 63$b$, the administrator-addressed message function part 63$c$, the emotion input part 63$d$, the other-person addressed message function part 84, the external evaluation display part 85, and the reaction input part 86. If the first user is a second grade user, the server 4 may set all of the following functions usable: the emergency input part 63$b$, the administrator-addressed message function part 63$c$, the emotion input part 63$d$, the other-person addressed message function part 84, the external evaluation display part 85, and the reaction input part 86.

Figure 7:
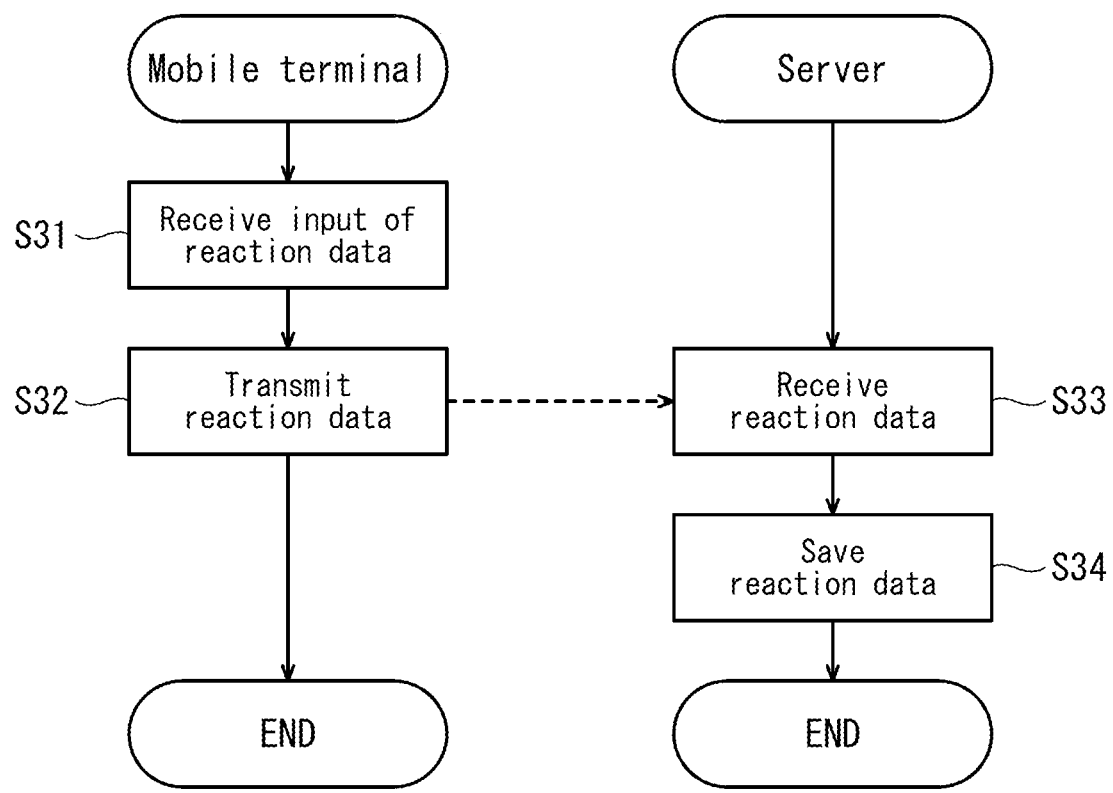
FIG. 7 is a flowchart of reaction data processing, which is performed in the information provision system illustrated in FIG. 3.

FIG. 7 is a flowchart of reaction data processing, which is performed in the information provision system 10 illustrated in FIG. 3. As illustrated in FIG. 7, upon selection (tapping) of the reaction input part 86 on the personal item page 52, which corresponds to the second user, a reaction input screen is displayed (step S31). The reaction input screen is for receiving input of reaction data. If a user who is not the second user inputs reaction data (for example, a positive reaction or a negative reaction) on the reaction input screen, the reaction data is transmitted to the server 4 (step S32). The server 4 receives the reaction data (step S33), and saves the received reaction data in the storage 23 in the server 4 by linking the reaction data with the second user (step S34). The server 4 may display the reaction data in the external evaluation display part 85 on the personal item page 52 of the second user. This enables the second user to be easily informed of the other user's reaction in the real space. For example, assume that this embodiment is applied in a railcar. In this case, when a user wants to express a reaction to a behavior of a passenger in the user's visually recognized area, the user is able to indirectly inform the passenger of the reaction, instead of directly such as by verbal communication.

Figure 8:
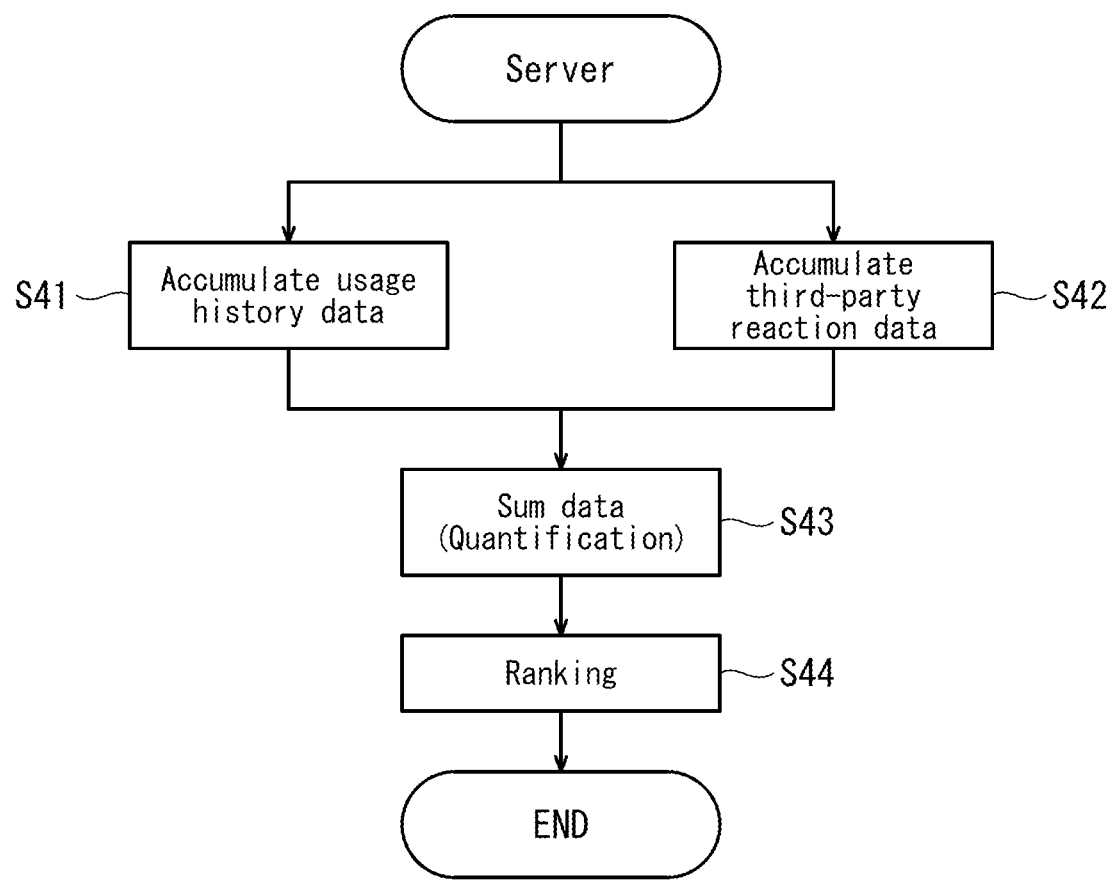
FIG. 8 is a flowchart of ranking processing performed based on external evaluation and performed in the information provision system illustrated in FIG. 3.

FIG. 8 is a flowchart of ranking processing performed based on external evaluation and performed in the information provision system 10 illustrated in FIG. 3. As illustrated in FIG. 8, the server 4 accumulates usage history data of the information presentation program P1 for each of the mobile terminals 1 to 3 (step S41). The usage history data may be an accumulation of the time periods for which the mobile terminal has been connected to the server 4 using the information presentation program P1, or may be an accumulation of the number of times that the mobile terminal has been connected to the server 4 using the information presentation program P1. The server 4 accumulates the reaction data from third parties to the second user (step S42). The reaction data to the second user is accumulated and saved at step S34 in FIG. 7.

The accumulated usage history data and the accumulated reaction data are collectively referred to as external evaluation data. The server 4 sums the external evaluation data and quantifies the external evaluation data based on a predetermined rule (for example, weighting arithmetic operation) (step S43). In the case of using a weighting arithmetic operation equation as the rule, it is possible to use such an example arithmetic equation that the following elements are regarded as additive elements and multiplied by a predetermined weight coefficient or raised to a power of a predetermined weight coefficient: "the number of publicized data items", "the number of train rides", "the frequency of access received", "the number of messages received", and "the number of positive reactions received"; and "the number of negative reactions" is regarded as a subtractive element and multiplied by a predetermined weight coefficient or raised to a power of a predetermined weight coefficient.

The server 4 quantifies the external evaluation data to obtain index numbers, and generates ranking data in which the index numbers are ranked in ascending or descending order (step S44). In generating the ranking data, the server 4 may sort the index numbers for each of railroad lines along which the train set 8 travels. For example, as the value of the usage history data is larger (for example, as the accumulated time period or the accumulated number of times is larger), the server 4 may more highly rank the second user. For further example, as there is more positive reaction data, the server 4 may more highly rank the second user. Another possible example is that the ranking may reflect the data of the first user, or may not necessarily reflect the data of the first user.

The ranking data in which the external evaluation data of the second user is reflected is displayed, for example, in the external evaluation display part 85 on the personal item page 52, which is displayed on the screen of the first mobile terminal 1. This enables the first user to immediately and accurately obtain information in which the external evaluation data of the second user is reflected by linking the external evaluation data with the real space. For example, assume that this embodiment is applied in a railway train. In this case, a user is able to obtain usage information regarding how the user is using the railroad line. A user is also able to obtain other persons' evaluations on the user's behavior or an other person's behavior, or to compare an evaluation on the user's behavior with an evaluation on an other person's behavior.

Figure 9:
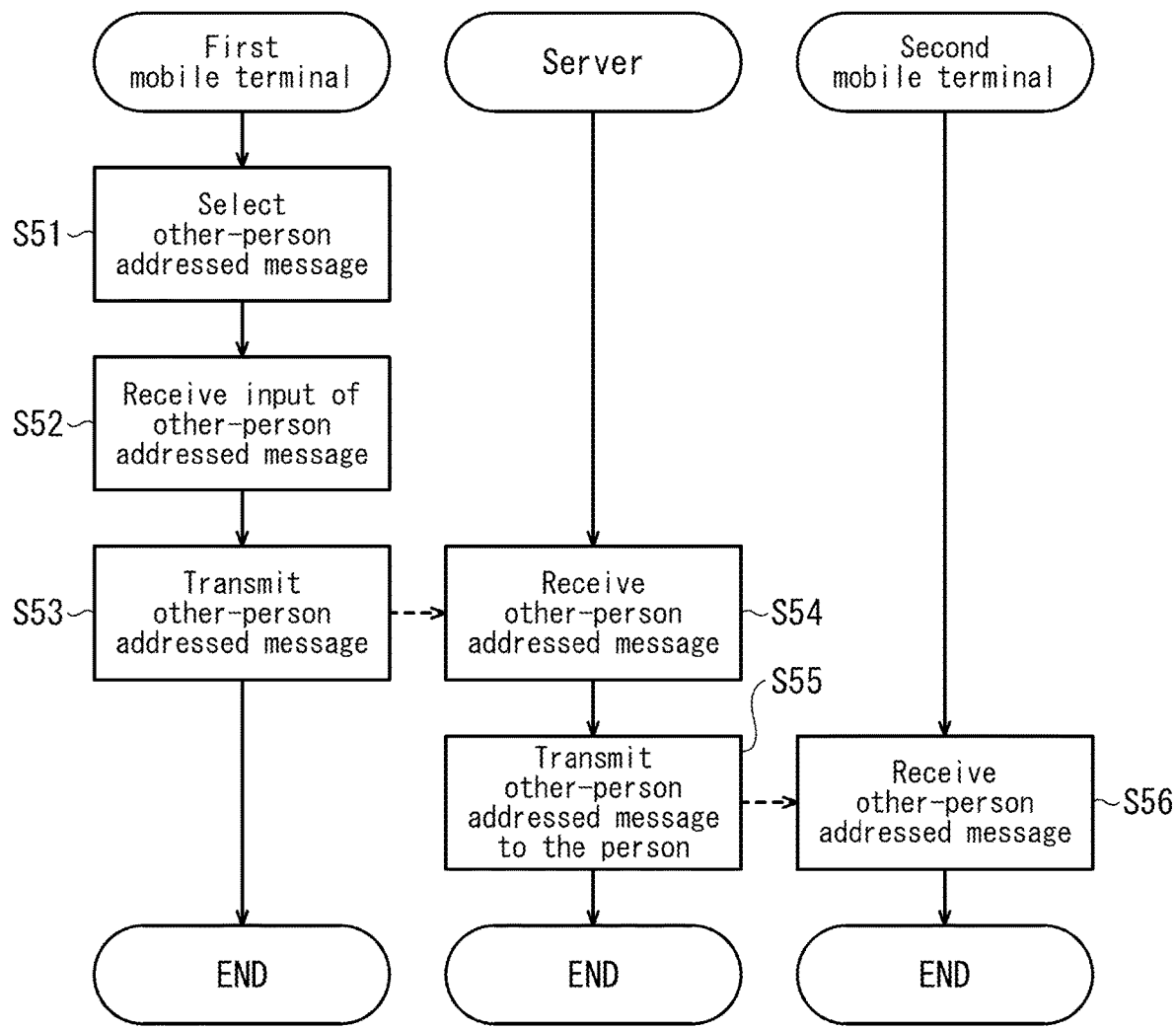
FIG. 9 is a flowchart of processing of an other-person addressed message, which processing is performed in the information provision system illustrated in FIG. 3.

FIG. 9 is a flowchart of processing of an other-person addressed message, which processing is performed in the information provision system 10 illustrated in FIG. 3. As illustrated in FIGS. 6(B) and 9, upon the first user selecting (tapping) the other-person addressed message function part 84, which is displayed on the first mobile terminal 1 (step S51), a message function screen is displayed (step S52). On the message function screen, an other-person addressed message can be transmitted and received. Upon the first user inputting an other-person addressed message on the message function screen and requesting transmission of the message to the second user, the other-person addressed message is transmitted to the server 4 (step S53). The server 4 receives the other-person addressed message (step S54).

The server 4 adds, to the other-person addressed message, information indicating that a transmission source is the first user, and transmits the other-person addressed message with the information to the second mobile terminal 2 (step S55). The second mobile terminal 2 receives the other-person addressed message (step S56). Then, the second mobile terminal 2 displays an unread message in the other-person addressed message function part 84. Upon the second user selecting (tapping) the other-person addressed message function part 84 on the second mobile terminal 2, the other-person addressed message and the information specifying the transmission source (the first user) are displayed. This function facilitates communication between users in the real space. For example, assume that this embodiment is applied in a railcar. In this case, when a user checks personal data of an other person on the same railcar and has a question to ask to the other person, the user is able to ask the question via a direct message.

Figure 10:
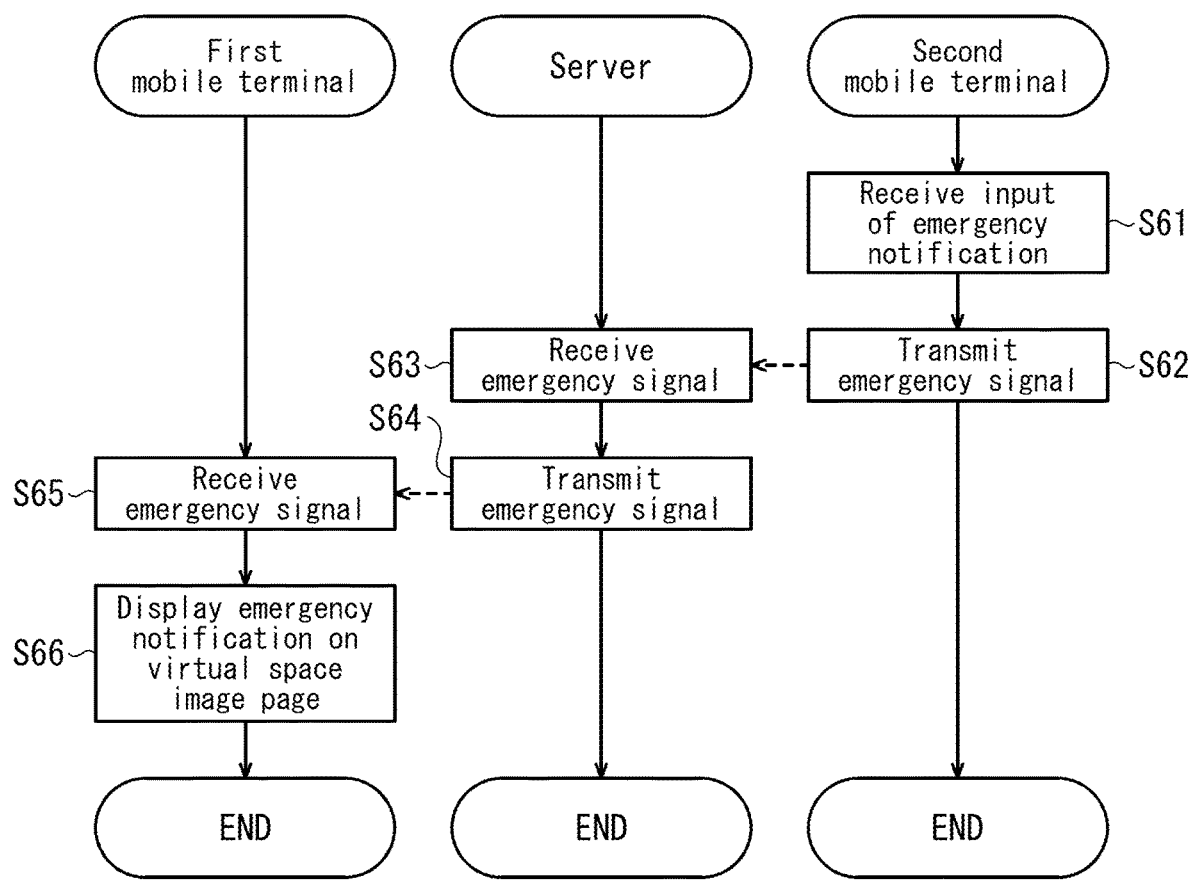
FIG. 10 is a flowchart of processing performed when an emergency occurs, which processing is performed in the information provision system illustrated in FIG. 3.

FIG. 10 is a flowchart of processing performed when an emergency occurs, which processing is performed in the information provision system 10 illustrated in FIG. 3. As illustrated in FIGS. 6(A) and 10, the second mobile terminal 2 receives input of a report of an emergency at the emergency input part 63b on the virtual space image page 51 (step S61). Upon the second user selecting (tapping) the emergency input part 63b, which is displayed on the second mobile terminal 2, a confirmation message appears. Upon the second user making a confirmation-accepting input, an emergency signal is transmitted to the server 4 (step S62). The server 4 receives the emergency signal (step S63).

The server 4 adds, to the emergency signal, information indicating that a transmission source is the second user, and transmits the emergency signal with the information to the first mobile terminal 1 (step S64). The first mobile terminal 1 receives the emergency signal (step S65). Then, the first mobile terminal 1 receives the emergency signal (step S65). Then, on the virtual space image page 51, the first mobile terminal 1 displays an emergency alert by linking the emergency alert with the other-person icon 71b of the second user (step S66). For example, the emergency alert may be displayed by changing the form of how to display the other-person icon 71b corresponding to the second user. Specifically, it is possible to cause the other-person icon 71b corresponding to the second user to blink. It is also possible to change the color of the other-person icon 71b corresponding to the second user to a predetermined color (for example, red). This function makes it easy inform the first user of an emergency by linking the emergency with the second user. For example, assume that this embodiment is applied in a railcar. In this case, a user is able to make an emergency notification upon finding an emergency case, trouble between passengers, a mess, or any other emergency situations on the train.

Figure 11:
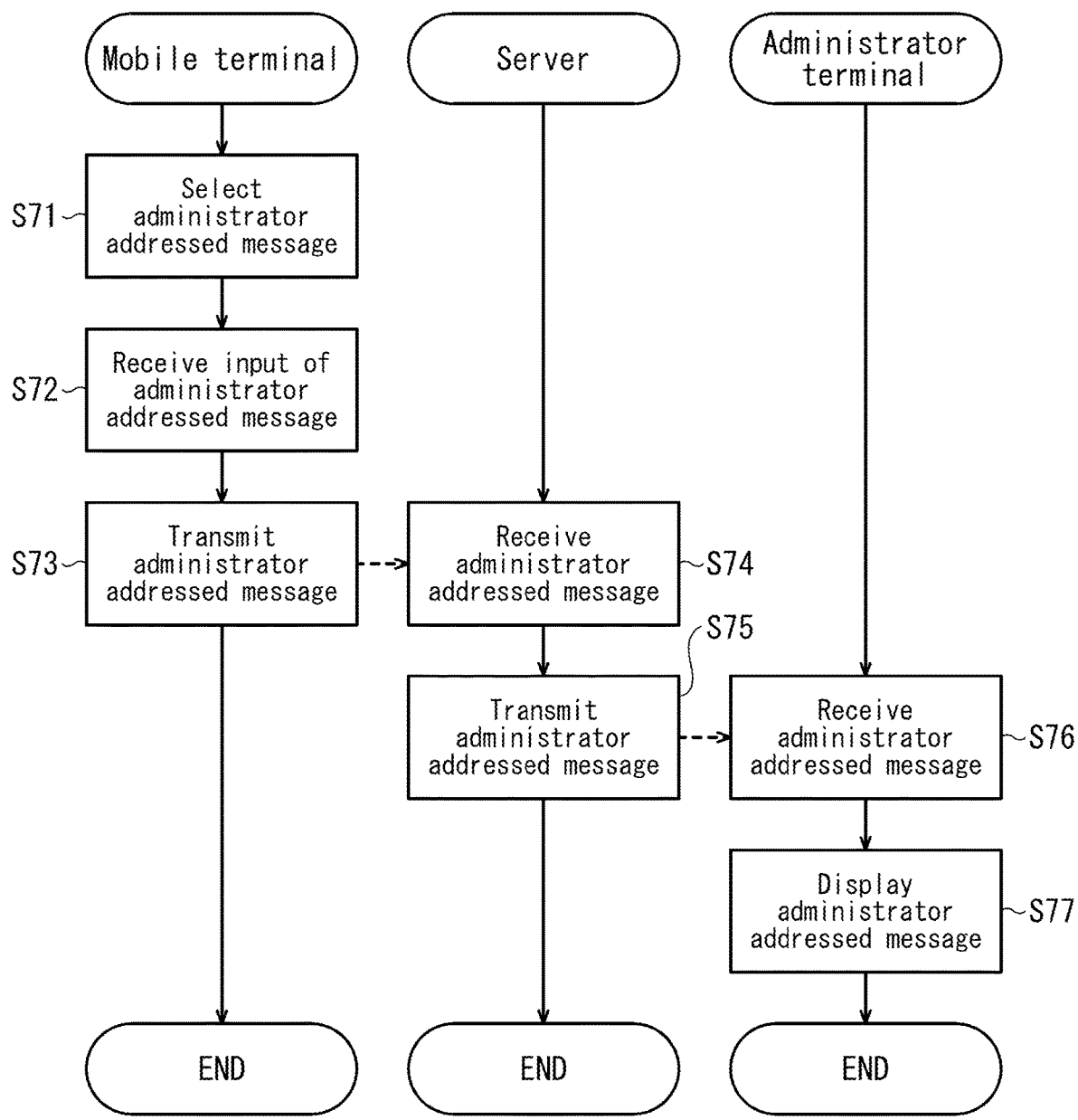
FIG. 11 is a flowchart of processing of an administrator addressed message, which processing is performed in the information provision system illustrated in FIG. 3.

FIG. 11 is a flowchart of processing of an administrator addressed message, which processing is performed in the information provision system 10 illustrated in FIG. 3. As illustrated in FIGS. 6(A) and 11, upon the first user selecting (tapping) the emergency input part 63b on the first mobile terminal 1 (step S71), a message function screen is displayed (step S72). On the message function screen, an administrator addressed message be transmitted and received. Upon the first user inputting an administrator addressed message on the message function screen and requesting transmission of the administrator addressed message, the administrator addressed message is transmitted to the server 4 (step S73). The server 4 receives the administrator addressed message (step S74).

The server 4 transmits the administrator addressed message to an administrator terminal (step S75), and the administrator terminal receives the administrator addressed message (step S76). To the administrator addressed message, at least one of the following information is preferably added: position coordinate information of the first user who is the transmission source of an emergency signal; and car number information of the target railcar 9, in which the first user exists. It is also preferable to add information of the user who is the transmission source (for example, a username). An example of the administrator terminal is a display terminal installed in the driver cabin of the train set 8. Another example of the administrator terminal is a display terminal carried by a crew member of the train set 8.

Then, the administrator terminal displays a notification of the emergency on the display screen of the administrator terminal (step S77). Specifically, the administrator terminal may display a position (for example, the car number) at which the emergency is occurring or the user information of the user who is the transmission source. This function makes it easy to inform the information to the administrator (for example, the crew member) of the train set 8 in which the first user exists.

Figure 12:
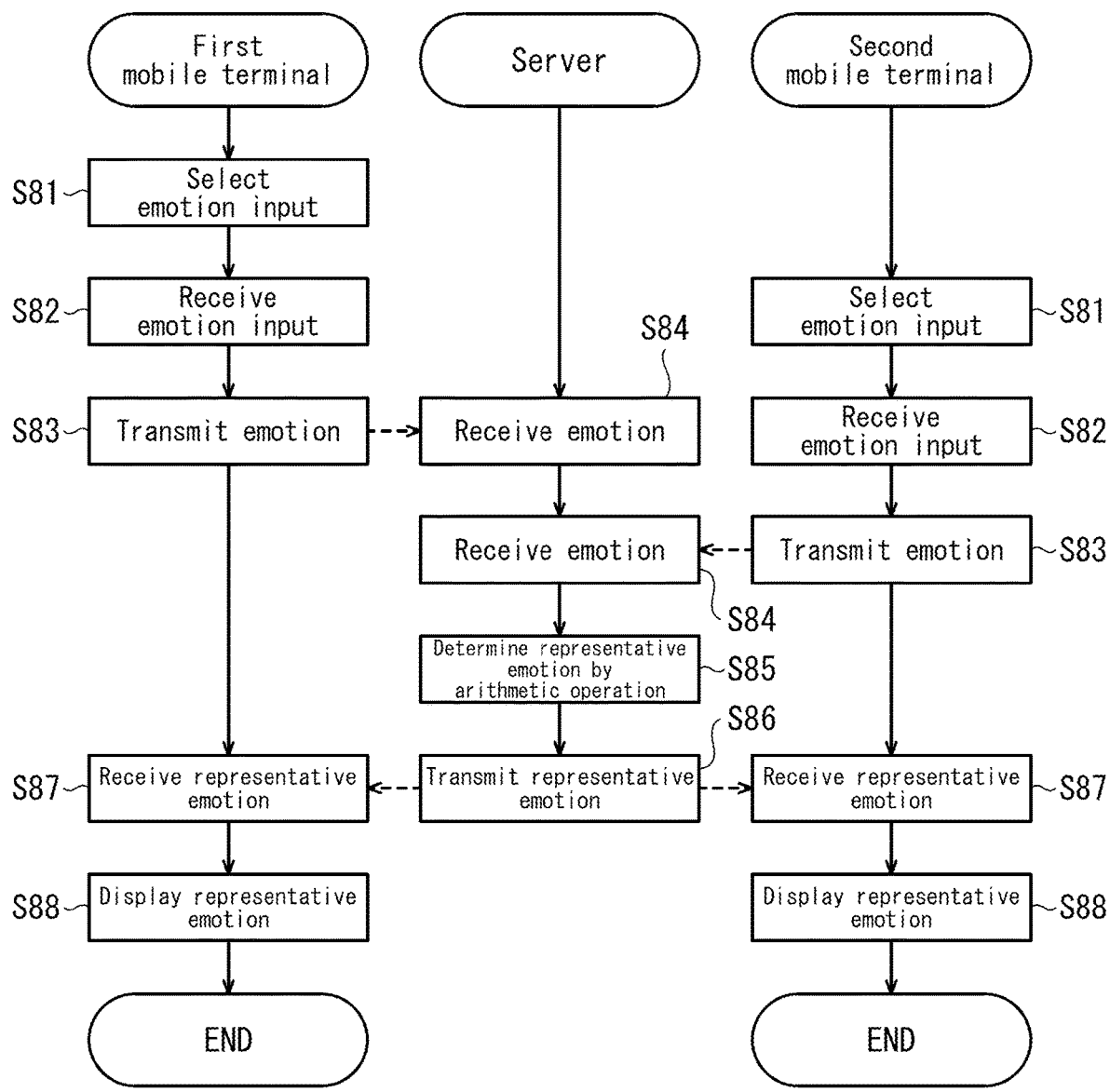
FIG. 12 is a flowchart of processing of a representative emotion, which processing is performed in the information provision system illustrated in FIG. 3.

FIG. 12 is a flowchart of processing of a representative emotion, which processing is performed in the information provision system 10 illustrated in FIG. 3. As illustrated in FIGS. 6(A) and 12, upon each of the first user and the second user selecting (tapping) the emotion input part 63d on the virtual space image pages 51 on the first or second mobile terminal 1 or 2 (step S81), such a screen is displayed that each user is able to select and input one of emotions (for example, happy, angry, sad, and amused) (step S82). On the screen, each user selects any one of the emotions and transmits the emotion to the server 4 (step S83).

The server 4 receives emotion data from the first mobile terminal 1 and emotion data from the second mobile terminal 2 (step S84). The server 4 performs an arithmetic operation to obtain a representative emotion based on the emotion received from each user (step S85). While only two users are illustrated in FIG. 12 for convenience of description, the server 4 is capable of receiving emotion data from three or more users in actual situations. For example, the server 4 selects the most popular emotion from among all the emotions received from the users, and determines this emotion as a representative emotion.

The server 4 transmits data of the determined representative emotion to the mobile terminals 1 and 2 (step S86). Each of the mobile terminals 1 and 2 displays content indicating the received representative emotion on the virtual space image page 51 (step S88). The content indicating the representative emotion may be an "emoji" or emoticon that indicates any of the happy, angry, sad, and amused emotions, or may be text that indicates any of the happy, angry, sad, and amused emotions. With this function, the users around the first user are informed of the representative emotion representing the emotions of the users and encouraged to behave according to the representative emotion.

The present invention will not be limited to the above-described embodiment, and any alterations, additions, or omissions may be made to the configurations of the embodiment. For example, the predetermined specific space, which includes the first position coordinate in the real space, may be all the interior spaces (for example, all passenger spaces or all floor spaces) of a structure (for example, a railcar or a building); and the space determined based on the first position coordinate may be a predetermined space section that is among sections of the interior of the entire structure (examples of such predetermined space section including the passenger space of the target railcar 9, in which the first position coordinate exists, and the floor space on which the first position coordinate exists).

Another possible example is that the predetermined specific space, which includes the first position coordinate in the real space, is an entirety of a privately owned limited exterior space (for example, an amusement park or an event venue) and that the space determined based on the first position coordinate is a predetermined space section that is among sections of the entire privately-owned space (an example of such predetermined space section being a predetermined attraction space in which the first position coordinate exists). The virtual space image 71 may not necessarily be an image of a field-of-view space; the virtual space image 71 may be a plan-view image of the entire predetermined space section with other-person icons disposed on the plan-view image.

In the above-described embodiment, the virtual space image page 51 is at a higher hierarchical level and the personal pages (the personal item page 52 and the personal detail page 53) are at a lower hierarchical level correlated with the higher hierarchical level. It is possible, however, to reverse the hierarchical levels. For example, based on the personal data of the users who exist in the predetermined specific space, which includes the first position coordinate in the real space, it is possible to perform matching processing of matching the users based on a predetermined condition (s). Then, a matching list obtained by the matching processing may be displayed on the first mobile terminal of the first user. Upon the first user selecting an other user whom the first user is interested in from the matching list, the personal page of the other user may be displayed. Upon the first user selecting a link on the personal page, a virtual space image page with an other-person icon corresponding to the other user may be displayed on the virtual space image page.

In this case, the matching list and part of the personal page may be accessible from the users of any grade while the rest of the personal page and the virtual space image page may be accessible only from high grade users, and inaccessible from low grade users. It is also possible to provide a low grade user with a matching list that covers only other users who exist in the predetermined space section, in which the first position coordinate exists, of the specific space; and to provide a high grade user with a matching list that covers other users who exist the entire specific space.

The functions of the elements disclosed in the present description may be performed using a circuit(s) or a processing circuit(s). The circuit(s) or the processing circuit(s) includes a circuit configured or programmed to perform the disclosed functions, examples including a general-purpose processor, a specific-purpose processor, an integrated circuit, an application-specific integrated circuit (ASIC), and a conventional circuit, and/or a combination of the foregoing circuits. A processor includes transistors and other circuits, and as such, is regarded as a processing circuit or a circuit. In the present disclosure, a circuit, a unit, or means is hardware configured to perform the functions recited or hardware programmed to perform the functions recited. The hardware may be the hardware disclosed in the present description, or any other known hardware programmed or configured to perform the functions recited. If the hardware is a processor considered to be a type of circuit, then a circuit, means, or a unit is a combination of hardware and software. The software is used as a configuration/configurations of the hardware and/or the processor.

The invention claimed is:

1. An information provision system comprising:
a processor configured to execute a program; and
a storage medium in which the program is stored,
the program causing the processor to:
acquire a first position coordinate indicating a position of a first smartphone of a first user, and acquire a second position coordinate indicating a position of a second smartphone of a second user;
generate a virtual space image comprising:
an image corresponding to a real space in a predetermined area including the first position coordinate; and
a second user icon corresponding to the second position coordinate in the real space;
cause the first smartphone to display the virtual space image; and
acquire data associated with the second user and cause the first smartphone to display the data associated with the second user by linking the data with the virtual space image, wherein:
the first position coordinate is a three-dimensional coordinate;
the second position coordinate is a three-dimensional coordinate;
the image corresponding to a real space is a field-of-view space image of a three-dimensional space that is visually recognized from the position corresponding to the first position coordinate; and
causing the first smartphone to display the virtual space image includes causing the first smartphone to display the virtual space image such that the second user icon is disposed at the second position coordinate on the field-of-view space image.

2. The information provision system according to claim 1, causing the first smartphone to display the virtual space image includes causing the first smartphone to display the virtual space image such that the second user icon reduces in size as a distance between the first position coordinate and the second position coordinate increases.

3. The information provision system according to claim 1, wherein, in causing the first smartphone to display the data associated with the second user, the data associated with the second user is displayed upon selection of the second user icon.

4. The information provision system according to claim 1, wherein the program causes the processor to:
periodically acquire the first position coordinate; and
update the virtual space image based on a movement of the first position coordinate.

5. The information provision system according to claim 1, wherein the program causes the processor to display the data associated with the second user specified for publication by the second user on the first smartphone by linking the data associated with the second user specified for publication by the second user with the virtual space image.

6. The information provision system according to claim 1, wherein the data associated with the second user comprises external evaluation data related to at least one selected from a group consisting of data indicating an actual usage of the program; and reaction data indicating a reaction of a third party.

7. The information provision system according to claim 6, wherein the external evaluation data comprises ranking data obtained by quantifying the external evaluation data based on a predetermined rule.

8. The information provision system according to claim 1, wherein the program causes the processor to:

acquire attribute information about a place where the first position coordinate exists; and cause the first smartphone to display the attribute information.

9. The information provision system according to claim 8, wherein the virtual space image is an image corresponding to a passenger space of a railcar comprising railcars connected to each other, wherein the first position coordinate is based on the passenger space, wherein the second position coordinate is based on the passenger space, and wherein the attribute information comprises information about the attribute of an railcar, among the railcars, in which the first position coordinate exists.

10. The information provision system according to claim 1, wherein the program causes the processor to:

receive a message addressed to the second smartphone from the first smartphone; and transmit the message to the second smartphone.

11. The information provision system according to claim 1, wherein the program causes the processor to:

receive, from the first smartphone, reaction data indicating a reaction of the first user to the second user; and cause the second smartphone to display the reaction data.

12. The information provision system according to claim 1, wherein the program causes the processor to:

receive an emergency signal from the second smartphone; and cause the first smartphone to, based on the emergency signal, display an emergency display on the virtual space image by correlating the emergency display with the second user icon.

13. The information provision system according to claim 1, wherein the program causes the processor to:

receive a message addressed to an administrator from the first smartphone; and transmit the message to the administrator.

14. The information provision system according to claim 1, wherein the program causes the processor to:

receive data indicating an emotion of the first user from the first smartphone and receive data indicating an emotion of the second user from the second smartphone;

calculate a representative emotion based on emotions of users including the first user and the second user; and cause the first smartphone to display the representative emotion on the virtual space image.

15. The information provision system according to claim 1, wherein the program causes the processor to:

store grade information of the first user; and change the predetermined area including the first position coordinate based on the grade information of the first user, and generate the virtual space image based on the changed predetermined area.

16. The information provision system according to claim 1, further comprising:

sensors disposed at predetermined places and configured to wirelessly communicate with the first smartphone and the second smartphone to acquire information that enables the first position coordinate of the first smartphone and the second position coordinate of the second smartphone to be specified; and a second processor configured to communicate with the sensors, wherein the second processor, which is configured to communicate with the sensors, is configured to calculate the first position coordinate of the first smartphone and the second position coordinate of the second smartphone based on the information from the sensors, and transmit the calculated first position coordinate and the calculated second position coordinate to the first smartphone.

17. A non-transitory and tangible storage medium storing an information presentation program for causing a processor to:

acquire a first position coordinate indicating a position of a smartphone of a first user;

generate a virtual space image comprising:

a space corresponding to a real space in a predetermined area including the first position coordinate; and a second user icon corresponding to a second position coordinate indicating a position of a second smartphone of a second user located in the real space;

cause the first smartphone to display the virtual space image; and acquire data associated with the second user and cause the first smartphone to display the data associated with the second user by linking the data with the virtual space image, wherein:

the first position coordinate is a three-dimensional coordinate;

the second position coordinate is a three-dimensional coordinate;

the image corresponding to a real space is a field-of-view space image of a three-dimensional space that is visually recognized from the position corresponding to the first position coordinate; and causing the first smartphone to display the virtual space image includes causing the first smartphone to display the virtual space image such that the second user icon is disposed at the second position coordinate on the field-of-view space image.

* * * * *